United States Patent
Sugimori et al.

(10) Patent No.: US 11,955,834 B2
(45) Date of Patent: Apr. 9, 2024

(54) BACKUP POWER SUPPLY DEVICE AND METHOD FOR CHARGING AND DISCHARGING THE SAME

(71) Applicant: FDK CORPORATION, Tokyo (JP)

(72) Inventors: Shunichiro Sugimori, Tokyo (JP); Naoaki Konda, Tokyo (JP)

(73) Assignee: FDK CORPORATION, Tokyo (JP)

(*) Notice: Subject to any disclaimer, the term of this patent is extended or adjusted under 35 U.S.C. 154(b) by 21 days.

(21) Appl. No.: 18/050,942

(22) Filed: Oct. 28, 2022

(65) Prior Publication Data

US 2023/0163624 A1    May 25, 2023

(30) Foreign Application Priority Data

Nov. 22, 2021 (JP) .................. 2021-189344

(51) Int. Cl.
*H02J 9/06* (2006.01)
*H02J 7/00* (2006.01)

(52) U.S. Cl.
CPC ............ *H02J 9/061* (2013.01); *H02J 7/0013* (2013.01); *H02J 7/007182* (2020.01)

(58) Field of Classification Search
CPC ...... H02J 9/06; H02J 9/061; H02J 7/00; H02J 7/007182; H02J 7/0013
See application file for complete search history.

(56) References Cited

U.S. PATENT DOCUMENTS

| | | |
|---|---|---|
| 2005/0052155 A1 | 3/2005 | Surig |
| 2005/0121979 A1 | 6/2005 | Matsumoto et al. |
| 2017/0063150 A1 | 3/2017 | Sakamoto et al. |

FOREIGN PATENT DOCUMENTS

JP    2019022318 A    2/2019

OTHER PUBLICATIONS

Extended European Search Report dated Apr. 6, 2023, for corresponding European Application No. 22204009.9.

*Primary Examiner* — Robert L Deberadinis
(74) *Attorney, Agent, or Firm* — Kinney & Lange, P.A.

(57) ABSTRACT

A backup power supply device to be connected to a conduction path from an external power supply to an external load includes a plurality of secondary batteries connected in parallel, a plurality of charging switches that can individually pass and cut off charging power from the conduction path to the plurality of secondary batteries, and a control device for performing discharging control on the plurality of secondary batteries when the power supply voltage of the conduction path drops below a predetermined power failure detection threshold value. When battery voltages of the plurality of secondary batteries drop below a predetermined charging start threshold value, the control device performs charging control with a time difference set between charging start timings of the secondary batteries.

12 Claims, 4 Drawing Sheets

BACKUP POWER SUPPLY DEVICE AND METHOD FOR CHARGING AND DISCHARGING THE SAME

CROSS-REFERENCE TO RELATED APPLICATION(S)

This application claims priority to Japanese Application No. 2021-189344 filed on Nov. 22, 2021, which is incorporated by reference herein in its entirety.

BACKGROUND

Technical Field

The present disclosure relates to a backup power supply device and a method for charging and discharging the same.

Description of the Related Art

A backup power supply device enables a load device to continue to operate by supplying power from a pre-charged secondary battery to the load device when power is not supplied from an external power supply to the load device due to a power failure or the like. In general, a backup power supply device is provided with a plurality of secondary batteries incorporated therein, and is connected onto a conduction path between an external power supply and a load device, whereby the secondary batteries are charged with power supplied from the external power supply during normal times without power failure.

Such a backup power supply device is often formed by connecting a necessary number of secondary batteries in parallel in consideration of a backup time (dischargeable time) in the event of a power failure. Here, the respective secondary batteries have the same charging voltage due to parallel charging during charging, but have different charging currents in some cases because the batteries have different resistance values or the like. Therefore, in a prior art disclosed in Japanese Patent Laid-Open No. 2019-22318, the resistance of each of batteries is detected to control the respective charging currents of the batteries.

The backup power supply device as described above generally monitors a power supply voltage in the conduction path between the external power supply and the load device, and determines that a power failure has occurred when the power supply voltage drops below a predetermined power failure detection threshold value, thereby controlling discharging of the incorporated secondary batteries. Further, the backup power supply device determines that charging is necessary when the battery voltages of the plurality of secondary batteries drop below a predetermined charging start threshold value, thereby controlling charging of the incorporated secondary batteries.

However, when charging of the plurality of secondary batteries connected in parallel is started, an instantaneous voltage drop of the power supply voltage may occur due to an inrush current flowing in from the external power supply into each secondary battery to drop the power supply voltage below a power failure detection threshold value, which causes false detection of a power failure state. In this case, the backup power supply device may start discharging even though charging is necessary.

An object of the present disclosure, which has been made in view of such a problem, is to provide a backup power supply device capable of suppressing false detection of a power failure when charging is started, and a method of charging and discharging the same.

SUMMARY

In order to attain the above object, a backup power supply device according to the present disclosure is a backup power supply device to be connected to a conduction path from an external power supply to an external load, comprising: a plurality of secondary batteries connected in parallel; a plurality of charging switches capable of individually passing and cutting off charging power to be supplied from the conduction path to the plurality of secondary batteries; and a control device for performing discharging control of the plurality of secondary batteries when a power supply voltage of the conduction path drops below a predetermined power failure detection threshold value, wherein when battery voltages of the plurality of secondary batteries drop below a predetermined charging start threshold value, the control device performs charging control with a time difference set between charging start timings of the secondary batteries.

Further, in order to attain the above object, a method for charging and discharging a backup power supply device according to the present disclosure is a method for charging and discharging a backup power supply device that is connected to a conduction path from an external power supply to an external load and includes a plurality of secondary batteries connected in parallel, the method comprising: performing discharging control of the plurality of secondary batteries when a power supply voltage of the conduction path drops below a predetermined power failure detection threshold value; and performing charging control with a time difference set between charging start timings of the secondary batteries when battery voltages of the plurality of secondary batteries drop below a predetermined charging start threshold value.

According to the backup power supply device and the method for charging and discharging the same according to the present disclosure, false detection of a power failure at the start of charging can be suppressed.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

Embodiments will be hereinafter described in detail with reference to the drawings. The present disclosure is not limited to the content described below, and can be arbitrarily changed and implemented without changing the subject matter of the present disclosure. Further, all of the drawings used to describe the embodiments schematically show constituent members, and are partially emphasized, enlarged, reduced, or omitted for the purpose of deepening understanding, and they may not represent the scales, shapes, etc. of the constituent members accurately.

Figure 1:
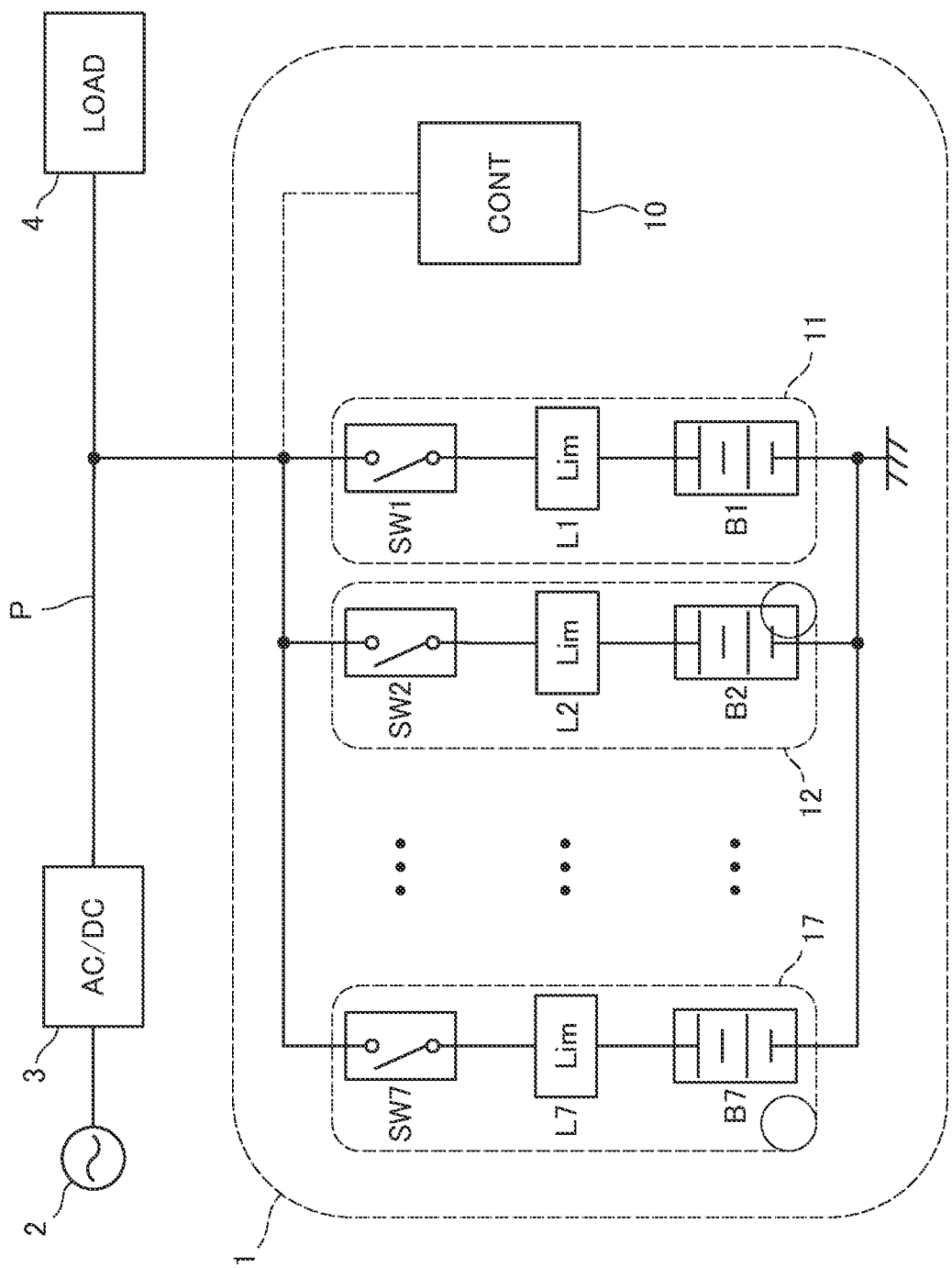
FIG. 1 is a circuit diagram showing a power supply system when a backup power supply device is used.

FIG. 1 is a circuit diagram showing a power supply system when a backup power supply device 1 is used. The backup power supply device 1 is a standby power supply which is connected to a conduction path P to convert AC power supplied from a commercial power supply 2 into DC power by an external power supply 3 and supply the DC power to an external load 4. In other words, when power cannot be supplied from the external power supply 3 to the external load 4 during a power failure, the backup power supply device 1 continuously supplies internally stored power to the external load 4 for a certain period of time. Further, the backup power supply device 1 keeps internal secondary batteries B1 to B7 described later at a state of charge (SOC) close to a full charge by the power supplied from the external power supply 3 during normal times without power failure, thereby preparing for occurrence of a power failure.

The backup power supply device 1 in the present embodiment includes a plurality of secondary batteries B1 to B7, a plurality of current limiters L1 to L7, a plurality of charging switches SW1 to SW7, and a control device 10. Here, the secondary battery B1, the current limiter L1, and the charging switch SW1 constitute a series connection unit 11. Like the series connection unit 11, each of the other secondary batteries B2 to B7, each of the other current limiters L2 to L7, and each of the other charging switches SW2 to SW7 also constitute each of series connection units 12 to 17. These series connection units 11 to 17 are connected in parallel between the conduction path P and a ground line, whereby the plurality of secondary batteries B1 to B7 are connected in parallel.

Each of the secondary batteries B1 to B7 is configured as an assembled battery in which a plurality of NiMH batteries are connected in series, for example. Here, the backup power supply device 1 in the present embodiment is exemplified as a configuration including seven secondary batteries B1 to B7. However, the number of batteries is not limited to seven, and it may be changed as appropriate according to the specification.

The current limiters L1 to L7 are circuits for limiting charging currents to be supplied to the secondary batteries B1 to B7, respectively. The secondary batteries B1 to B7 can be charged with constant currents by the current limiters L1 to L7.

Each of the charging switches SW1 to SW7 comprises, for example, MOSFET (Metal Oxide Semiconductor Field Effect Transistor), and is connected so as to be able to individually pass or cut off charging power to be supplied from the conduction path P to each of the secondary batteries B1 to B7.

The control device 10 comprises, for example, a publicly known microcomputer control circuit. According to a charging and discharging method described below, the control device 10 monitors the battery voltages of the secondary batteries B1 to B7 to determine whether charging is necessary or not and charge the secondary batteries B1 to B7, and also monitors the power supply voltage of the conduction path P to detect occurrence of a power failure and cause the secondary batteries B1 to B7 to discharge. More specifically, the control device 10 sets the charging switches SW1 to SW7 to ON to start charging control when the battery voltages of the secondary batteries B1 to B7 drop below a predetermined charging start threshold value. Further, the control device 10 performs discharging control on the secondary batteries B1 to B7 when the power supply voltage of the conduction path P drops below a predetermined power failure detection threshold value.

Here, when the control device 10 switches all the charging switches SW1 to SW7 to ON at the start of the charging control of the secondary batteries B1 to B7, the control device 10 causes a voltage drop to occur in the power supply voltage of the conduction path P due to an inrush current flowing from the external power supply 3 into each of the secondary batteries B1 to B7. At this time, if the power supply voltage drops below the power failure detection threshold value due to the voltage drop in the conduction path P, it causes false detection of a power failure state, so that the secondary batteries B1 to B7 start discharging even though they need to be charged.

Figure 2:
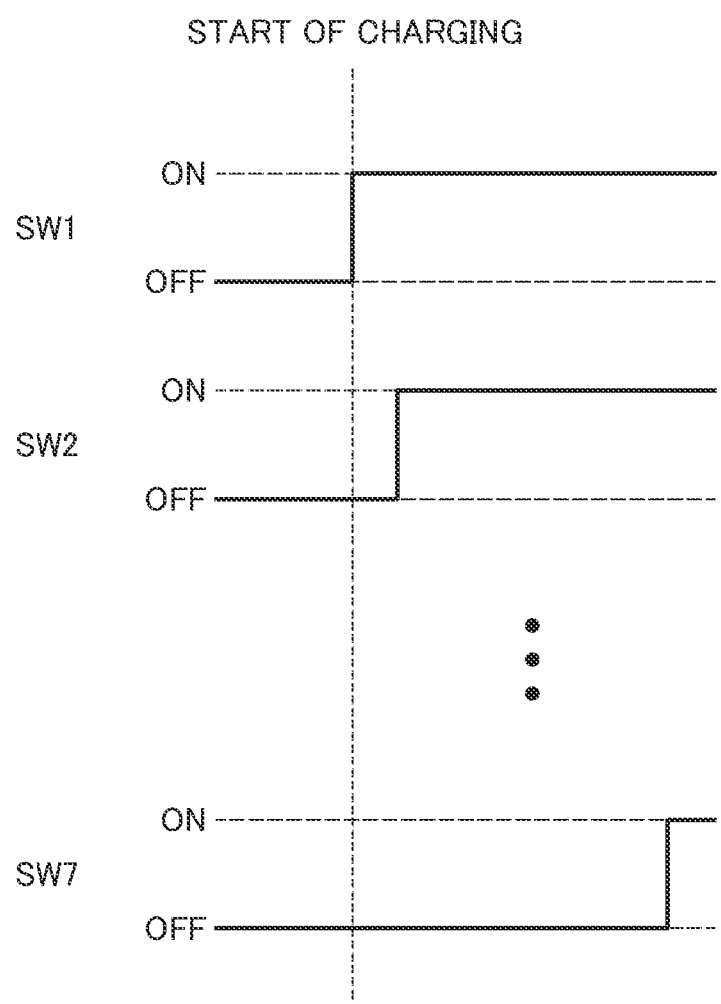
FIG. 2 is a timing chart showing switching of a charging switch at the start of charging control.

Therefore, the control device 10 performs charging control with a time difference set between charging start timings of the secondary batteries B1 to B7, whereby the inrush current is temporally dispersed to suppress the voltage drop in the conduction path P. FIG. 2 is a timing chart showing switching of the charging switches SW1 to SW7 at the start of charging control. As shown in FIG. 2, a time difference is set in switch timing from OFF to ON between the charging switches SW1 to SW7.

Figure 3:
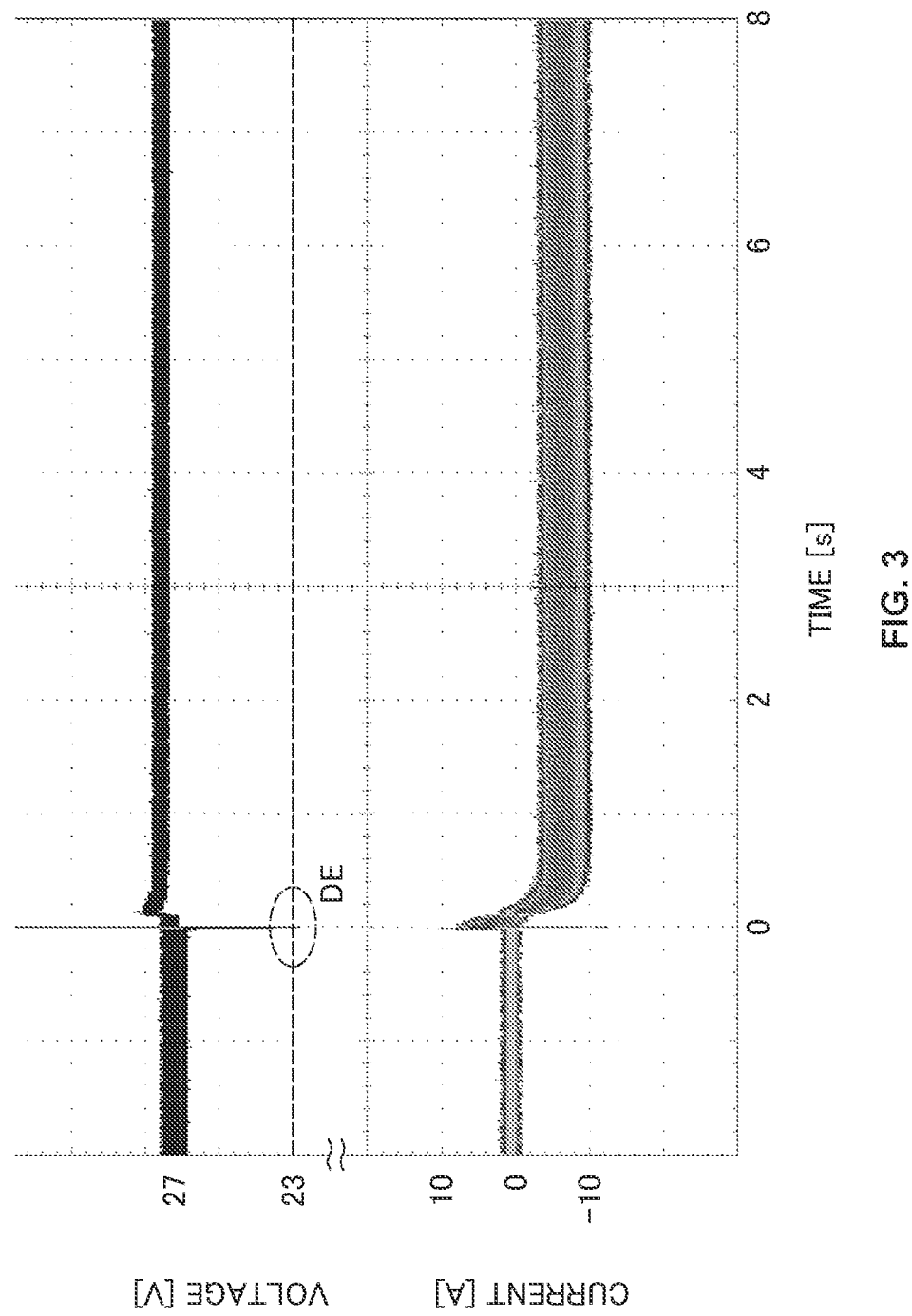
FIG. 3 shows waveforms representing a power supply voltage and a charging current when charging of a plurality of secondary batteries is started at the same time.
Figure 4:
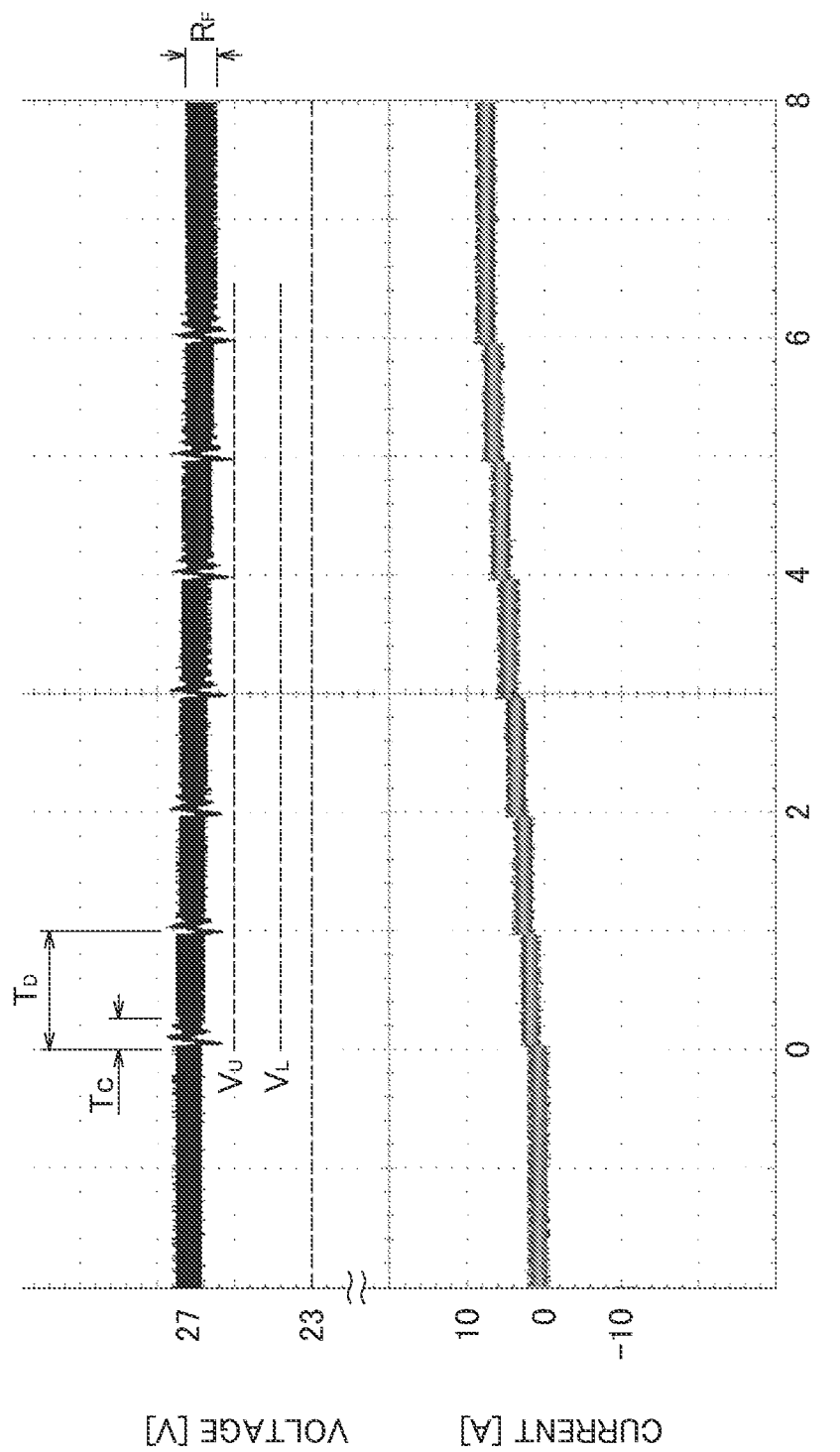
FIG. 4 shows waveforms representing a power supply voltage and a charging current when the start of charging of the plurality of secondary batteries is staggered.

Next, an effect of the backup power supply device 1 according to the present disclosure will be described. FIG. 3 shows waveforms representing the power supply voltage and the charging current when charging of the secondary batteries B1 to B7 is started at the same time. FIG. 4 shows waveforms representing the power supply voltage and the charging current when the start of charging is staggered among the secondary batteries B1 to B7.

More specifically, FIGS. 3 and 4 show a change in the power supply voltage of the conduction path P and a change in the charging current flowing from the conduction path P into the backup power supply device 1 with the time elapsed from the start of charging control set on a horizontal axis. Here, in the present embodiment, the rated output voltage of the external power supply 3 is set to 27V, and the power failure detection threshold value is set to 23V. It is assumed that the rated voltage of the backup power supply device 1 is about 20V to about 29V according to the SOC of the secondary batteries B1 to B7.

As can be seen in FIG. 3, when the secondary batteries B1 to B7 are started to be charged at the same time, the charging current momentarily increases at the timing when charging control is started, and the accompanying voltage drop causes the power supply voltage to drop from the rated output voltage of 27V till the power failure detection threshold value of 23V or less (broken-line ellipse DE). As a result, the control device 10 erroneously detects that the backup power supply device 1 is in a power failure state, and starts discharging control of the secondary batteries B1 to B7.

On the other hand, the control device 10 according to the present embodiment sequentially switches the charging switches SW1 to SW7 to ON with a time difference TD=1 s set between charging start timings of the secondary batteries B1 to B7. Therefore, as can be seen in FIG. 4, the voltage drop of the power supply voltage is suppressed, and false detection of a power failure does not occur, so that it is possible to supply the charging current to each of the secondary batteries B1 to B7. Note that the time difference TD is not limited to 1 s, and it can be arbitrarily set as long as there is not any condition as described later.

Here, the control of setting the time difference TD for the start of charging can be simplified by setting the interval of sequentially switching all the charging switches SW1 to SW7 to a constant interval. Further, the time difference TD is set to be longer than a convergence time TC in which the voltage drop at the start of charging of each of the secondary batteries B1 to B7 converges, whereby it is possible to reliably prevent false detection of a power failure caused by the voltage drop.

Furthermore, the power failure detection threshold value described above may be set in a voltage range having an upper limit value VU which is set to a minimum value of a voltage drop of the power supply voltage dropping when one of the secondary batteries B1 to B7 is individually charged, and a lower limit value VL which is set to a minimum value of a voltage drop of the power supply voltage dropping when two of the secondary batteries B1 to B7 are charged at the same time. For example, in the case of the voltage waveform of FIG. 4, the voltage before charging is started is equal to 27V, and the voltage when charging of one secondary battery B1 is started is equal to 25.5V, so that the upper limit value VU=25.5V and the lower limit value VL=24V are satisfied. These numerical values can be confirmed and set in the control device 10 before the backup power supply device 1 is put into operation.

In this case, the control device 10 can set the power failure detection threshold value to a high value to the extent that it is possible to avoid false detection of a power failure caused by a voltage drop at the start of charging, so that occurrence of a power failure can be quickly detected.

At this time, the voltage range from the lower limit value VL to the upper limit value VU may be corrected with a range of fluctuation RF of the power supply voltage in a steady state. For example, when the range of fluctuation RF is equal to 1V in FIG. 4, the upper limit value VU is corrected to 25.5V−1V=24.5V, the lower limit value VL is corrected to 24V−1V=23V, and the power failure detection threshold value is set in this voltage range, so that it is possible to avoid false detection of a power failure caused by fluctuations in the power supply voltage even when the power failure detection threshold value is set to be relatively high.

The control device 10 may measure the range of fluctuation RF of the power supply voltage at the start of operation and set the power failure detection threshold value. More specifically, when the backup power supply device 1 is connected to the conduction path P and starts to operate, the control device 10 measures the power supply voltage of the conduction path P, and sets the power failure detection threshold value based on the range of fluctuation RF as described above. As a result, the control device 10 can set the power failure detection threshold value suitable for the conduction path P where the backup power supply device 1 is installed.

As described above, the backup power supply device 1 according to the present disclosure sets a time difference TD between charging start timings of the plurality of secondary batteries B1 to B7, thereby dispersing the inrush current flowing in from the external power supply 3 to suppress the voltage drop of the power supply voltage, so that it is possible to reduce a risk that the power supply voltage drops below the power failure detection threshold value. Therefore, according to the backup power supply device 1 of the present disclosure, false detection of a power failure at the start of charging can be suppressed.

EMBODIMENTS OF THE PRESENT DISCLOSURE

A first embodiment of the present disclosure is a backup power supply device to be connected to a conduction path from an external power supply to an external load, the backup power supply device comprising: a plurality of secondary batteries connected in parallel; a plurality of charging switches capable of individually passing and cutting off charging power to be supplied from the conduction path to the plurality of secondary batteries; and a control device for performing discharging control of the plurality of secondary batteries when a power supply voltage of the conduction path drops below a predetermined power failure detection threshold value, wherein when battery voltages of the plurality of secondary batteries drop below a predetermined charging start threshold value, the control device performs charging control with a time difference set between charging start timings of the secondary batteries.

According to the first embodiment, by setting a time difference between charging start timings of the plurality of secondary batteries, the inrush current flowing in from the external power supply is dispersed to suppress the voltage drop of the power supply voltage, so that it is possible to reduce a risk that the power supply voltage drops below the power failure detection threshold value. Therefore, according to the backup power supply device of the first embodiment, it is possible to suppress false detection of a power failure at the start of charging.

A second embodiment of the present disclosure is a backup power supply device in which the time difference is set to a constant interval in the first embodiment.

According to the second embodiment, it is possible to simplify the control for setting the time difference between the charging start timings.

A third embodiment of the present disclosure is a backup power supply device in which the time difference is set to be longer than a convergence time in which a voltage drop at the start of charging of each of the secondary batteries converges in the first or second embodiment.

According to the third embodiment, after the voltage drop at the start of charging of one secondary battery converges, charging of a next secondary battery is started. Therefore, it is possible to surely prevent false detection of a power failure caused by the voltage drop.

A fourth embodiment of the present disclosure is a backup power supply device in which the power failure detection threshold value is set in a voltage range having an upper limit value which is set to a minimum value of a voltage drop of the power supply voltage dropping when one of the secondary batteries is individually charged, and a lower limit value which is set to a minimum value of a voltage drop of the power supply voltage dropping when two of the secondary batteries are charged simultaneously in any one of the first to third embodiments.

According to the fourth embodiment, the power failure detection threshold value can be set to be high to the extent that it is possible to avoid false detection of a power failure caused by a voltage drop at the start of charging, so the occurrence of a power failure can be quickly detected.

A fifth embodiment of the present disclosure is a backup power supply device in which the voltage range is corrected with a range of fluctuation of the power supply voltage in a steady state in the fourth embodiment.

According to the fifth embodiment, even when the power failure detection threshold value is set to be relatively high, it is possible to avoid false power failure detection caused by fluctuations in the power supply voltage.

A sixth embodiment of the present disclosure is a backup power supply device in which the control device measures the range of fluctuation of the power supply voltage at the start of operation to set the power failure detection threshold value in the fifth embodiment.

According to the sixth embodiment, when the backup power supply device is connected to the conduction path and starts to operate, the power supply voltage of the conduction path is measured, and the power failure detection threshold value is set based on the range fluctuation, whereby it is possible to set a power failure detection threshold value suitable for the conduction path where the backup power supply device is installed.

A seventh embodiment of the present disclosure is a method for charging and discharging a backup power supply device that is connected to a conduction path from an external power supply to an external load and includes a plurality of secondary batteries connected in parallel, the method comprising: performing discharging control of the plurality of secondary batteries when a power supply voltage of the conduction path drops below a predetermined power failure detection threshold value, and performing charging control with a time difference set between charging start timings of the secondary batteries when battery voltages of the plurality of secondary batteries drop below a predetermined charging start threshold value.

According to the seventh embodiment, by setting the time difference between the charging start timings of the plurality of secondary batteries, the inrush current flowing in from the external power supply is dispersed to suppress the voltage drop of the power supply voltage, so that it is possible to reduce a risk that the power supply voltage drops below the power failure detection threshold value. Therefore, according to the method for charging and discharging the backup power supply device of the seventh embodiment, it is possible to suppress false detection of a power failure at the start of charging.

An eighth embodiment of the present disclosure is a method for charging and discharging a backup power supply device in which the time difference is set to a constant interval in the seventh embodiment.

According to the eighth embodiment, it is possible to simplify the control for setting the time difference between the charging start timings.

A ninth embodiment of the present disclosure is a method for charging and discharging a backup power supply device in which the time difference is set to be longer than a convergence time in which a voltage drop when charging of one of the secondary batteries is started converges in the seventh or eighth embodiment.

According to the ninth embodiment, after the voltage drop at the start of charging of one secondary battery converges, charging of a next secondary battery is started. Therefore, it is possible to surely prevent false detection of a power failure caused by the voltage drop.

A tenth embodiment of the present disclosure is a method for charging and discharging a backup power supply device in which the power failure detection threshold value is set in a voltage range having an upper limit value which is set to a minimum value of a voltage drop of the power supply voltage dropping when one of the secondary batteries is individually charged, and a lower limit value which is set to a minimum value of a voltage drop of the power supply voltage dropping when two of the secondary batteries are charged simultaneously in any one of the seventh to ninth embodiments.

According to the tenth embodiment, the power failure detection threshold value can be set to be high to the extent that it is possible to avoid false detection of a power failure caused by a voltage drop at the start of charging, so the occurrence of a power failure can be quickly detected.

An eleventh embodiment of the present disclosure is a method for charging and discharging a backup power supply device in which the voltage range is corrected with a range of fluctuation of the power supply voltage in a steady state in the tenth embodiment.

According to the eleventh embodiment, even when the power failure detection threshold value is set to be relatively high, it is possible to avoid false power failure detection caused by fluctuations in the power supply voltage.

A twelfth embodiment of the present disclosure is a method for charging and discharging a backup power supply device in which the range of fluctuation of the power supply voltage is measured at the start of operation to set the power failure detection threshold value in the eleventh embodiment.

According to the twelfth embodiment, when the backup power supply device is connected to the conduction path and starts to operate, the power supply voltage of the conduction path is measured, and the power failure detection threshold value is set based on the range fluctuation, whereby it is possible to set a power failure detection threshold value suitable for the conduction path where the backup power supply device is installed

What is claimed is:

1. A backup power supply device to be connected to a conduction path from an external power supply to an external load, comprising:
   a plurality of secondary batteries connected in parallel;
   a plurality of charging switches capable of individually passing and cutting off charging power to be supplied from the conduction path to the plurality of secondary batteries; and
   a control device for performing discharging control of the plurality of secondary batteries when a power supply voltage of the conduction path drops below a predetermined power failure detection threshold value, wherein when battery voltages of the plurality of secondary batteries drop below a predetermined charging start threshold value, the control device performs charging control with a time difference set between charging start timings of the secondary batteries.

2. The backup power supply device according to claim 1, wherein the time difference is set to a constant interval.

3. The backup power supply device according to claim 1, wherein the time difference is set to be longer than a convergence time in which a voltage drop at the start of charging of each of the secondary batteries converges.

4. The backup power supply device according to claim 1, wherein the power failure detection threshold value is set in a voltage range having an upper limit value which is set to a minimum value of a voltage drop of the power supply voltage dropping when one of the secondary batteries is individually charged, and a lower limit value which is set to a minimum value of a voltage drop of the power supply voltage dropping when two of the secondary batteries are charged simultaneously.

5. The backup power supply device according to claim 4, wherein the voltage range is corrected with a range of fluctuation of the power supply voltage in a steady state.

6. The backup power supply device according to claim 5, wherein the control device measures the range of fluctuation of the power supply voltage at the start of operation to set the power failure detection threshold value.

7. A method for charging and discharging a backup power supply device that is connected to a conduction path from an external power supply to an external load and includes a plurality of secondary batteries connected in parallel, the method comprising:

performing discharging control of the plurality of secondary batteries when a power supply voltage of the conduction path drops below a predetermined power failure detection threshold value; and performing charging control with a time difference set between charging start timings of the secondary batteries when battery voltages of the plurality of secondary batteries drop below a predetermined charging start threshold value.

8. The method for charging and discharging a backup power supply device according to claim 7, wherein the time difference is set to a constant interval.

9. The method for charging and discharging a backup power supply device according to claim 7, wherein the time difference is set to be longer than a convergence time in which a voltage drop when charging of one of the secondary batteries is started converges.

10. The method for charging and discharging a backup power supply device according to claim 7, wherein the power failure detection threshold value is set in a voltage range having an upper limit value which is set to a minimum value of a voltage drop of the power supply voltage dropping when one of the secondary batteries is individually charged, and a lower limit value which is set to a minimum value of a voltage drop of the power supply voltage dropping when two of the secondary batteries are charged simultaneously.

11. The method for charging and discharging a backup power supply device according to claim 10, wherein the voltage range is corrected with a range of fluctuation of the power supply voltage in a steady state.

12. The method for charging and discharging a backup power supply device according to claim 11, wherein the range of fluctuation of the power supply voltage is measured at the start of operation to set the power failure detection threshold value.

* * * * *